Figure 1:
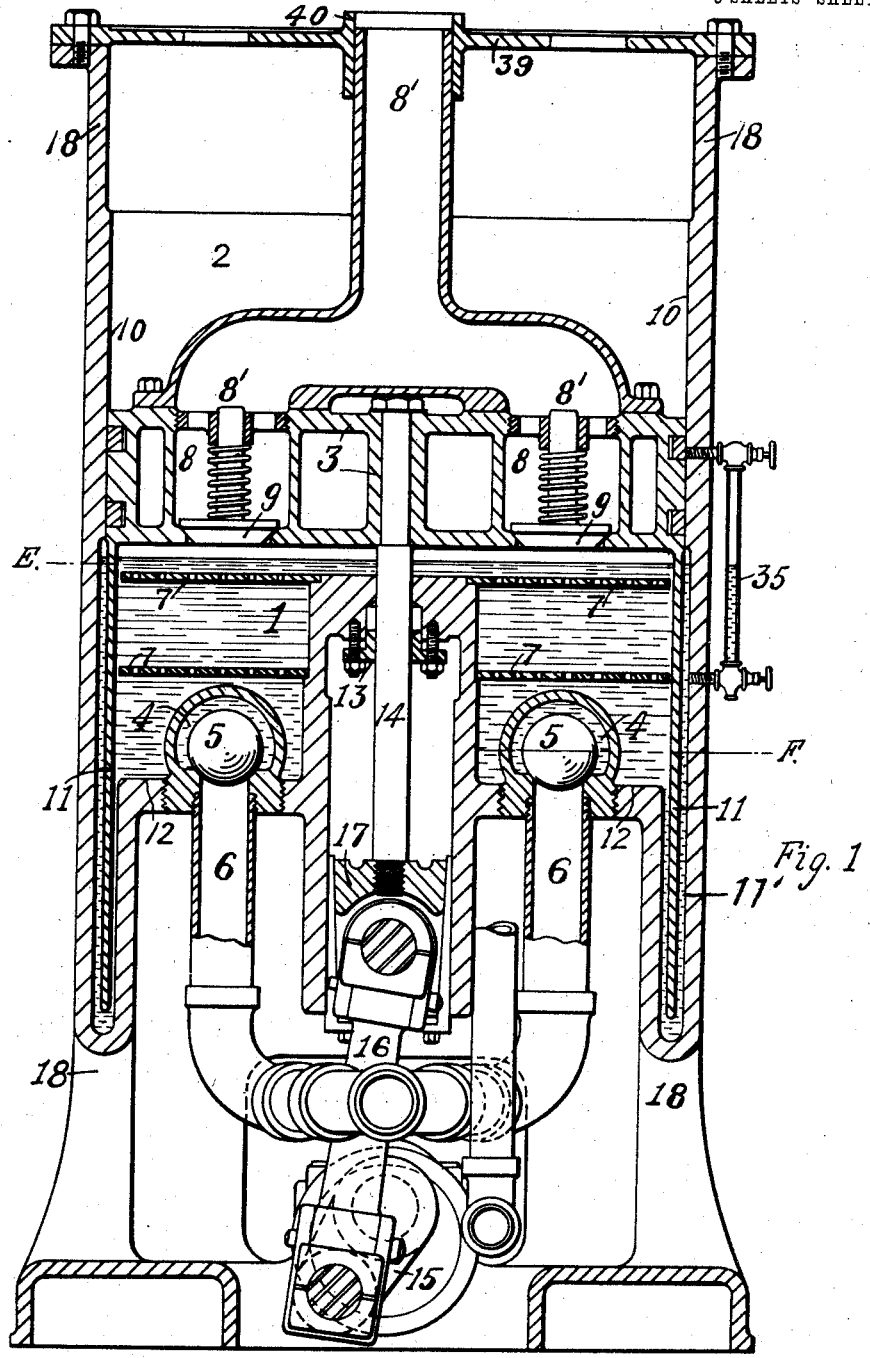

No. 893,853. PATENTED JULY 21, 1908.
W. LOCKE & E. B. DUNN.
APPARATUS FOR REMOVING DUST BY PNEUMATIC SUCTION.
APPLICATION FILED MAR. 9, 1906.

5 SHEETS—SHEET 1.

WITNESSES:
Charles Seward
Fred O. Rush.

INVENTORS
William Locke
Elias B. Dunn.

No. 893,853. PATENTED JULY 21, 1908.
W. LOCKE & E. B. DUNN.
APPARATUS FOR REMOVING DUST BY PNEUMATIC SUCTION.
APPLICATION FILED MAR. 9, 1906.

5 SHEETS—SHEET 3.

WITNESSES:
Charles Seward
Fred O. Rush.

INVENTORS
William Locke
Elias B. Dunn

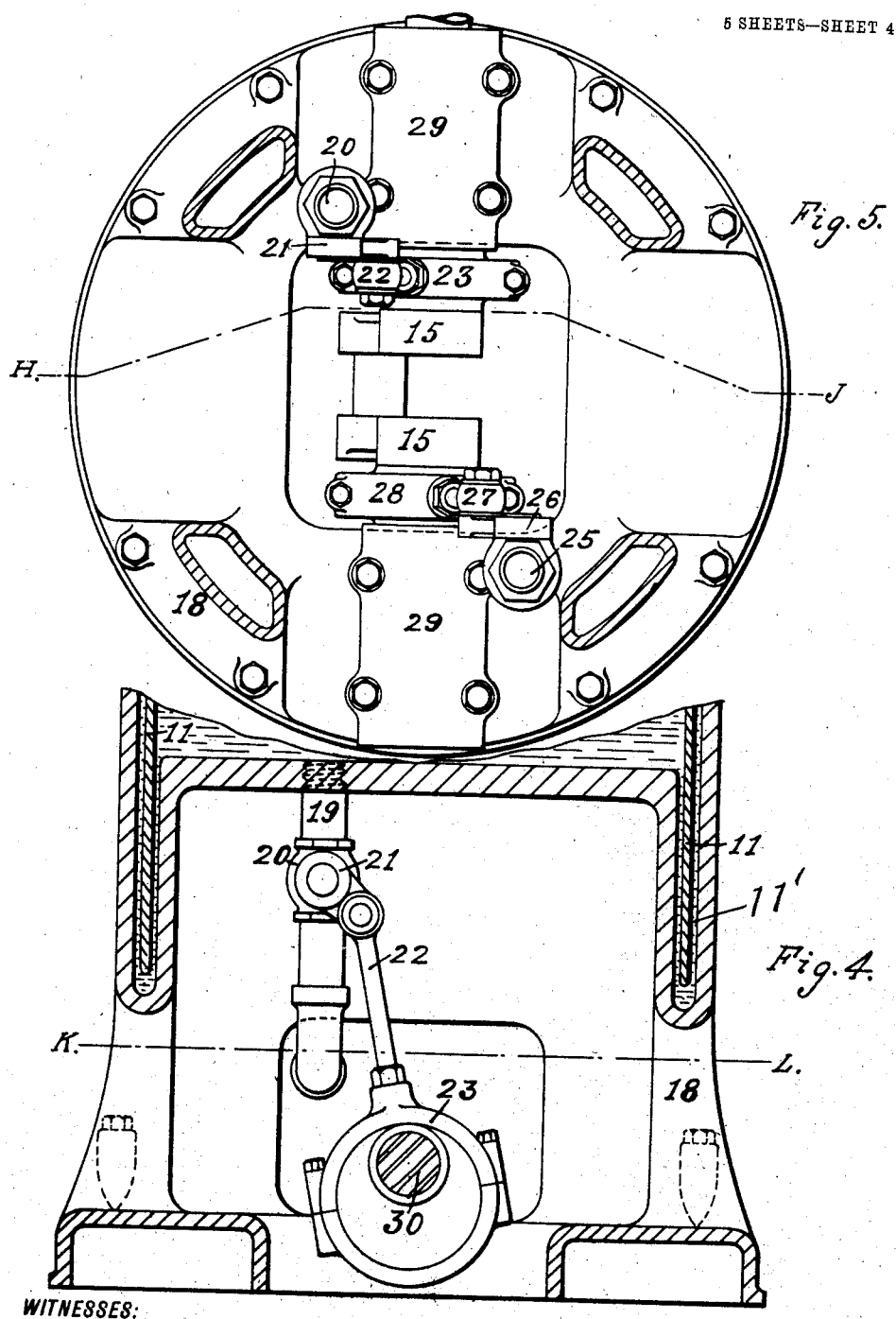

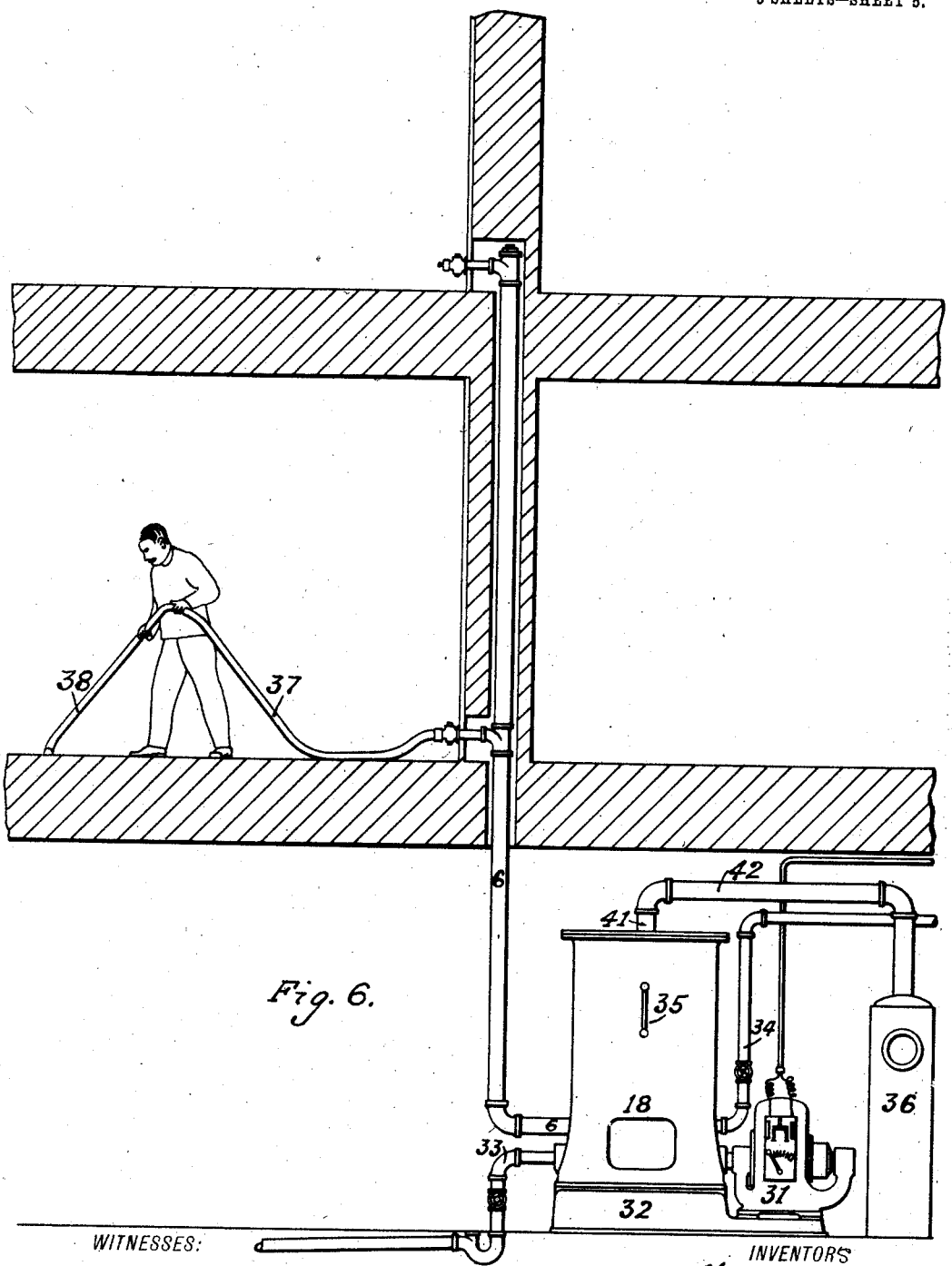

UNITED STATES PATENT OFFICE.

WILLIAM LOCKE, OF WESTFIELD, AND ELIAS B. DUNN, OF EAST ORANGE, NEW JERSEY, ASSIGNORS, BY MESNE ASSIGNMENTS, TO VACUUM ENGINEERING COMPANY, A CORPORATION OF NEW YORK.

APPARATUS FOR REMOVING DUST BY PNEUMATIC SUCTION.

No. 893,853.     Specification of Letters Patent.     Patented July 21, 1908.

Application filed March 9, 1906. Serial No. 305,015.

*To all whom it may concern:*

Be it known that we, WILLIAM LOCKE, a citizen of the United States, and a resident of Westfield, county of Union, State of New Jersey, and ELIAS B. DUNN, a citizen of the United States, and a resident of East Orange, county of Essex, State of New Jersey, have invented certain new and useful Improvements in Apparatus for Removing Dust by Pneumatic Suction, of which the following is a full, clear, and complete disclosure.

Briefly stated, our invention relates to improvements in the apparatus for producing a pneumatic suction for the purpose stated, and comprises a device of the nature of a pump, which is provided with a certain construction whereby the parts thereof are completely protected from the action of the dirt or dust passing through the same, and whereby the dust laden air may be taken directly into the suction apparatus, thus avoiding the necessity of using costly and undesirable separating apparatus for extracting the dust and dirt from the air.

This construction embodies a reciprocating plunger or piston located in a piston chamber above the body of a liquid, such as water, through which the dust laden air or air and water is drawn by the plunger or piston, said plunger or piston being completely protected by means of an apron coöperating with the plunger, said liquid being so placed and arranged in relation to the plunger that there is no hindrance or impediment, either to the action of the plunger or to the air passing through and mixing with the liquid.

A further object of our invention involved in the construction referred to is to prevent the possibility of serious explosion by the ignition of the fine particles of dust in rapid motion, by thoroughly absorbing them in the liquid.

The apparatus above briefly referred to produces a vacuum, or partial vacuum, which is transmitted through suitable conduits or pipes from a suction nozzle, which is passed over the surface to be cleaned, so that the dust and air or dust, air and water which are caused to enter the nozzle, by means of the suction, are carried through the conduits to the suction device where they become mixed with the liquid, some of the mixture containing a slight amount of liquid and dust being ejected in a more or less foamy condition and fresh liquid being at the same time continually supplied to replace the liquid discharged either as foam or through the liquid outlet.

Figure 2:
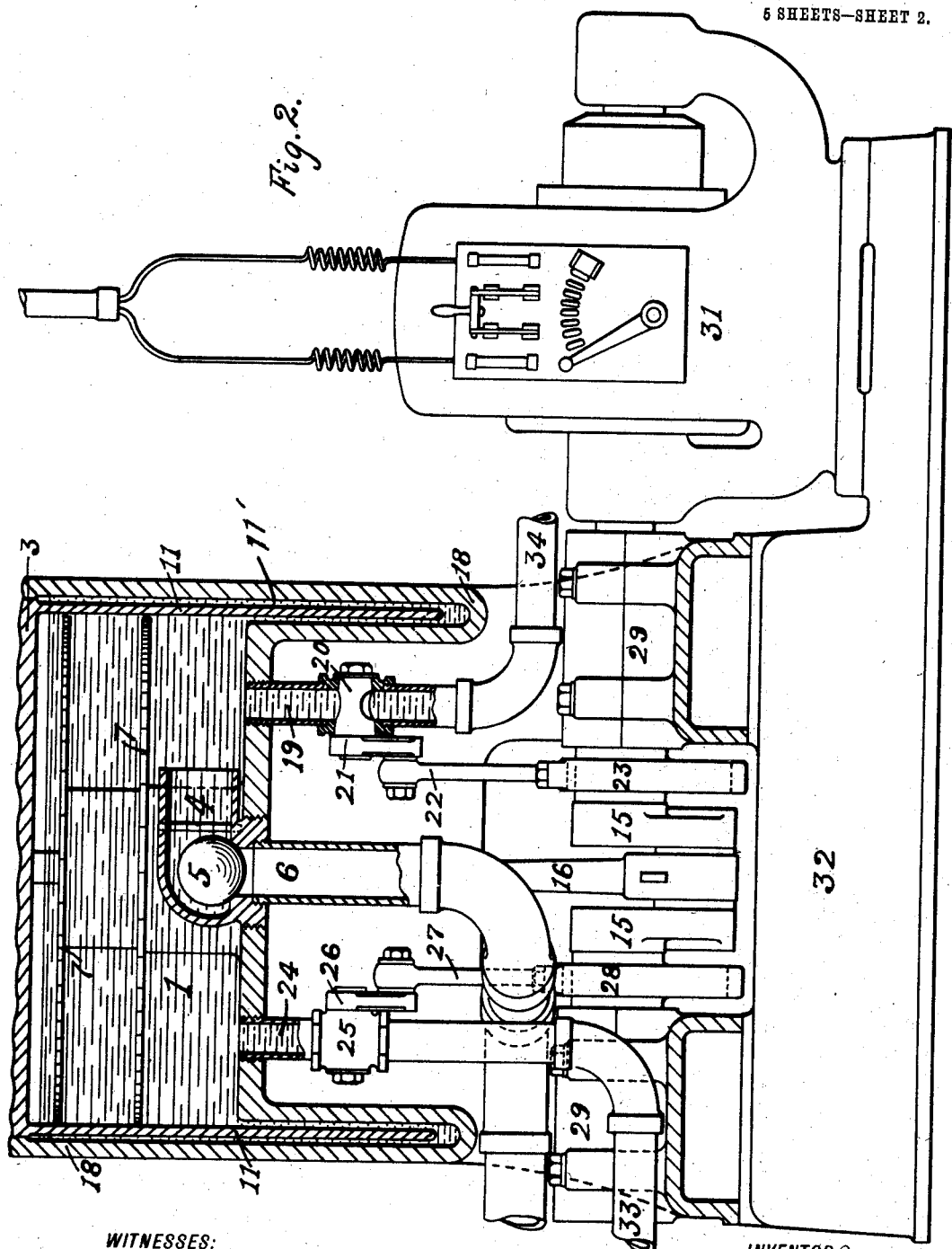
Figure 3:
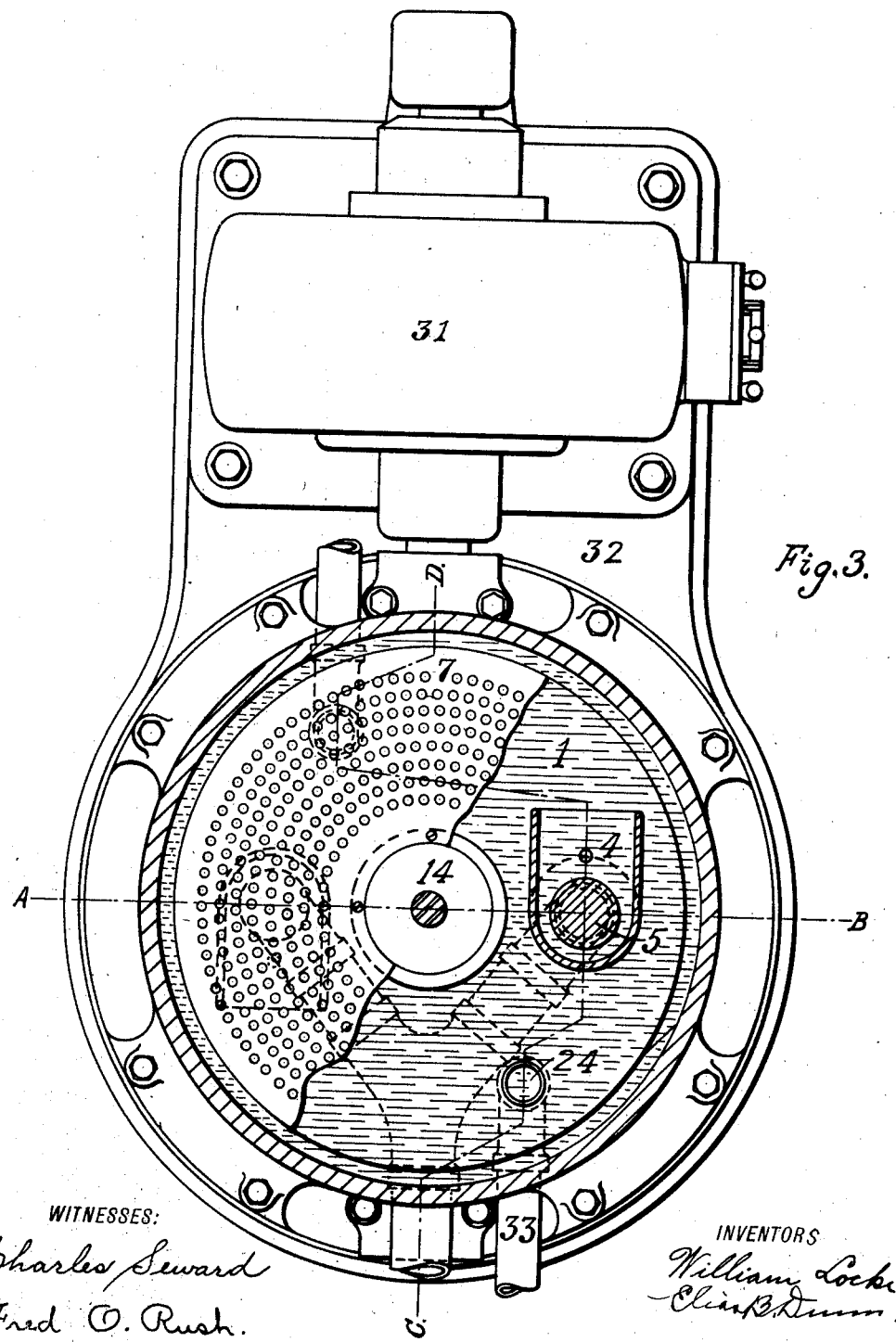

For a full, clear, and exact description of this form of our invention, reference may be had to the following description, together with the accompanying drawings forming a part thereof, in which Figure 1 is a vertical sectional view of the pump or suction device, taken at right angles to the crank shaft, and on the line A—B, Fig. 3; Fig. 2 is a vertical sectional view of the pump, taken parallel with the crank shaft, and on the line C—D, Fig. 3; Fig. 3 is a horizontal cross sectional view, taken through the liquid or absorbing chamber, and substantially on the line E—F, Fig. 1; Fig. 4 is a vertical cross sectional view of the suction device showing the means for controlling the fluid supply, and taken on the line H—J, Fig. 5; Fig. 5 is a horizontal sectional view taken on the line K—L, Fig. 4. Fig. 6 is a sectional elevation of a building showing the complete apparatus in operation.

In Fig. 1, the numeral 1 indicates the liquid or saturating chamber filled with water or other suitable liquid. A vacuum, or partial vacuum, is created above the surface of this liquid by means of a reciprocating piston 3 in the chamber 2. The air intake ports 4 are provided with automatic valves 5, and which we have shown in the form of ball valves, the said ports being connected with suitable conduits or pipes 6, through which the dust-laden air or air and water is carried to the absorbing chamber 1. In the upper portion of the liquid or saturating chamber 1, we provide baffle-plates 7, through the small perforations or holes of which the dust, air and water must pass, thereby being thoroughly mixed with the liquid, so that the dust is caught and held by the latter, the discharge of light portions of the mixture taking place through suitable air-passages 8. These air-passages, in this instance, are formed in the piston 3 itself, the air-passages 8 being provided with suitable spring-pressed valves 9, which are opened in the well known way during the downward stroke of the piston, but are closed during the upward stroke of the same. The air-passages 8 communicate with the passage 8', formed by a hood attached to the piston 3 and which terminates in a cylindrical discharge-port adapted to reciprocate in an opening in the top of the casing of the suction device, as indicated at 40.

In order to protect the bearing surface of the piston 3 and the surface of the piston casing 10 from the dirt or grit which is drawn into the suction device, a long cylindrical apron is provided, which is preferably attached or made a part of the piston 3, and projects therefrom into the liquid contained in the saturating chamber 1. This apron is carried far enough below the surface of the liquid in the saturating chamber so that its lower edge will never rise above the bottom 12 of said chamber, and for this purpose projects into a suitable cylindrical groove or recess, 11', extending downward from said saturating chamber 1. It should be noted in this form of the device, that the absorbing or saturating chamber 1 constitutes practically an extension of the piston chamber 2, there being no interposed partition or other devices which would prevent the freest passage of the air from the liquid to the space beneath the piston 3. It should also be noted that the surface of the liquid or absorbing chamber 1 is slightly greater in diameter than that of the piston chamber, and that the diameter of the apron 11 is slightly less than that of the piston 3. This provides a space between the apron and the walls of the liquid chamber, so that any foreign matter that adheres to the apron 11 as it rises from the absorbing fluid may be retained by the liquid and will not be transmitted to the bearing surfaces between the piston and its casing. The piston-rod 14 is attached to the center of the piston 3 and projects through a stuffing-box 13 and is connected to a crank 15 by means of a connecting-rod or pitman 16. The crank 15 is carried by the crank-shaft 30. The end of the piston-rod 14 is guided by means of a suitable cross-head 17 adapted to reciprocate in the cylindrical opening in the liquid chamber 1.

By the construction just described, it will be seen that a reciprocating motion is given to the piston 3, whereby the air is drawn through the pipes 6, through the water in the liquid chamber 1, and through the baffle-plates, during the upward motion of the piston 3, while during the downward motion of the piston, the air and portions of the mixture are expelled through the valve ports 8 and through the discharge passages 8'.

Attached to the cover 39 of the piston casing 18, is a pipe connection 41, which communicates with the opening 40, and is of sufficient height to allow the cylindrical portion of the discharge passage 8' to reciprocate within it. This pipe 41 may communicate with a suitable noise-muffling and settling device, as shown at 36 in Fig. 6. A rotary motion may be imparted to the crank shaft 30 by means of any suitable source of motive power, but for convenience of illustration we have shown an electric motor 31, located on the same bed or base 32 with the suction device.

By referring to Fig. 2 it will be seen that the casings of the air inlet ports 4 are directed laterally in opposite directions, which thereby tend to rotate the liquid and move the same, together with the dust-laden air, in a circular path, which further aids in the complete absorption of the dust particles by the liquid.

It is obvious that the fluid in the absorbing chamber would soon become depleted and more or less completely saturated and thickened by the dust and dirt constantly being drawn into it, unless the said liquid is constantly renewed during the operation of the apparatus. For this purpose we have provided a continuous supply of liquid through a supply pipe 34, Fig. 2. The supply pipe 34 is provided with a vertical portion 19, in which is placed an automatically operated valve 20. The movable member of this valve 20 is given a periodic, reciprocating motion by means of a crank arm 21 carried by the same, said crank arm being connected with an eccentric 28, carried on the crank shaft 30, by means of a pitman or connecting-rod 22. It will be seen that each revolution of the crank-shaft 30 opens and closes the valve 20, thereby allowing a certain definite amount of the liquid to enter the liquid chamber 1 at each stroke of the piston 3. A similar arrangement also allows some of the liquid mixed with the dust to be discharged through the drain pipe 33, if necessary, for which purpose the upward extension 24 of the drain pipe 33 is provided with a valve 25 operated by means of a crank 36 connected with an eccentric 28 on the crank-shaft 30 by a connecting rod 27. By suitable adjustment of the valves 20 and 25, the liquid in the chamber 1 is maintained at a substantially constant level, which level may be ascertained by means of a suitable water-glass or gage 35, placed on the outside of the casing 18.

In Fig. 6 the intake pipe 6 is shown extended through a building, with outlet taps on each floor, to which the flexible conduit or pipe 37 may be connected; the said conduit 37 terminating in the nozzle 38, which is passed over the surface, carpet, or other article being cleaned.

We believe that we are the first to devise a suction cleaning apparatus comprising a saturating chamber and a piston chamber, wherein the dust laden air is first thoroughly mixed or saturated with liquid, without the use of separators for preventing the dust and dirt passing to the suction apparatus, the dust, dirt and air being discharged directly from said apparatus.

Having thus described one form of our in- vention, it will be evident that we do not desire to be limited to the exact details of construction set forth, for various changes may be made by persons skilled in the art without departing from the spirit and scope of our invention.

What we claim and desire to protect by Letters Patent of the United States is:

1. In a pneumatic suction cleaning apparatus, the combination of a liquid saturating chamber having an intake orifice therein situated below the normal level of the liquid, a piston chamber, a reciprocating piston therein acting to create a suction above said level whereby dirt, air and liquid are drawn through the saturating chamber, outlet orifices for discharging lighter portions of the mixture and for dirt and liquid, and means for controlling the flow through said orifices.

2. In a pneumatic suction cleaning apparatus, the combination of a piston chamber and a saturating chamber opening into said piston chamber, a piston in said piston chamber operating to draw the mixture above the normal level of liquid in said saturating chamber, air inlet conduits entering said saturating chamber below the normal level of the liquid, discharge conduits above the level of the liquid, means for reciprocating said piston, and valves for controlling the flow through said saturating chamber.

3. In a pneumatic suction cleaning apparatus, the combination of a piston chamber and a saturating chamber communicating with said piston chamber, dust absorbing liquid in said saturating chamber, a piston in said chamber, means for maintaining the level of said liquid out of contact with said piston, air inlet conduits in said mixing chamber below the level of the liquid, discharge conduits above the level of said liquid, means for reciprocating said piston, and means for controlling the flow through said saturating chamber.

4. In a pneumatic suction cleaning apparatus, the combination of a piston chamber and a saturating chamber adapted to contain a dust absorbing liquid and communicating directly with said piston chamber, the inlet to said saturating chamber being below the normal level of the liquid therein, a piston in said piston chamber acting to create a suction above said level to draw dust, air and liquid through the saturating chamber, means for reciprocating the piston, and means for controlling the flow through said saturating chamber.

5. In a pneumatic suction cleaning apparatus, the combination of a piston chamber and a saturating chamber connected with said piston chamber, dust absorbing liquid in said saturating chamber, a piston in said piston chamber acting to create a suction above the level of the liquid, an apron or guard member extending into the liquid from said piston, means for reciprocating said piston and suitable means for controlling the flow through said chamber.

6. In a pneumatic suction cleaning apparatus, the combination of a piston chamber and a saturating chamber directly connected with said piston chamber, dust absorbing liquid in said saturating chamber, a piston in said piston chamber acting above the level of said liquid, baffle plates located within said saturating chamber and below the surface of said liquid, air ports entering said saturating chamber below the level of said liquid, air discharge ports, means for controlling the discharge from said saturating chamber, and means for reciprocating the piston.

7. In a pneumatic suction cleaning apparatus, the combination of a piston chamber and a saturating chamber connected with said piston chamber, dust absorbing liquid in said saturating chamber, a piston in said piston chamber operating to withdraw the mixture from above the level of said liquid, an apron or guard member attached to the lower side of said piston and extending into the liquid, and means for reciprocating the piston.

8. In a pneumatic suction cleaning apparatus, the combination of a piston chamber, a saturating chamber connected therewith adapted to contain a dust absorbing liquid, a non-submerged piston in said piston chamber, an inlet orifice therein below the surface of said liquid, means for controlling the flow through said saturating chamber and through the liquid therein, means for reciprocating said piston, fluid supply and discharge conduits connected with said saturating chamber, and means connected with said piston operating means for automatically controlling the level and the supply of liquid in said saturating chamber.

9. In a pneumatic suction cleaning apparatus, the combination of a piston chamber and a saturating chamber directly connected therewith and adapted to contain a dust absorbing liquid, a piston in said piston chamber, means for reciprocating said piston, liquid supply and discharge conduits connected with said saturating chamber, valves in said conduits, and means connecting said valves and said reciprocating means for automatically controlling the level and the supply of liquid in said saturating chamber.

10. In a pneumatic suction cleaning apparatus, the combination of a piston chamber and a saturating chamber directly connected therewith and adapted to contain a dust absorbing liquid, a piston in said piston chamber acting to withdraw the mixture above the normal level of said liquid, said saturating chamber having air passages operating respectively above and below the level of the liquid therein, valves in said passages, means for supplying liquid to said saturating chamber and for automatically maintaining a definite level of the liquid therein, and means for reciprocating said piston.

11. In a pneumatic suction cleaning apparatus, the combination of a saturating chamber, a piston chamber, a nonsubmerged reciprocating piston therein, an apron interposed between the saturating chamber and the piston chamber, and means for reciprocating the piston, substantially as set forth.

12. In a pneumatic suction cleaning apparatus, the combination of a saturating chamber, a piston chamber, a non-submerged reciprocating piston having air discharge passages therein, valves in said air discharge passages, an apron interposed between the saturating chamber and the piston chamber, and means for reciprocating the piston, substantially as set forth.

13. In a pneumatic suction cleaning apparatus, the combination of a saturating chamber, submerged intake orifices, valves in said intake orifices, a piston chamber, a non-submerged reciprocating piston therein, an apron interposed between the saturating chamber and the piston chamber, and means for reciprocating the piston, substantially as set forth.

14. In a pneumatic suction cleaning apparatus, the combination of a saturating chamber, submerged intake orifices, valves in said intake orifices, perforated diaphragm interposed between intake orifices and reciprocating piston, the piston chamber, a non-submerged reciprocating piston, air discharge passages through said piston, an apron interposed between the saturating chamber and the piston chamber, and means for reciprocating the piston, substantially as set forth.

15. In a pneumatic suction cleaning apparatus the combination of a saturating chamber, a fluid supply connection, a valve controlling the fluid supply, mechanical means for automatically operating the fluid controlling valve, a piston chamber, a non-submerged reciprocating piston, an apron interposed between the saturating chamber and the piston chamber and means for imparting motion to the said part substantially as set forth.

16. In a pneumatic suction cleaning apparatus, the combination of a saturating chamber, a fluid discharge connection, a valve controlling the fluid discharge, mechanical means for automatically operating the fluid discharge valve, a piston chamber, a non-submerged reciprocating piston, an apron interposed between the saturating chamber and the piston chamber, and means for imparting motion to the said parts, substantially as set forth.

In testimony whereof we have affixed our signatures in the presence of two witnesses.

Dated, N. Y. March 8, 1906.

WILLIAM LOCKE.
ELIAS B. DUNN.

Witnesses:
WM. GOLDBURG,
JOHN GOLDBURG.